US007601422B2

(12) United States Patent
Gersch et al.

(10) Patent No.: US 7,601,422 B2
(45) Date of Patent: Oct. 13, 2009

(54) ROUNDED-PARTICLE PLASTIC POWDER IN PARTICULAR FOR APPLICATION IN LASER SINTERING, METHOD FOR PRODUCTION OF SUCH A POWDER AND LASER SINTERING PROCESS USING SUCH A POWDER

(75) Inventors: Mandy Gersch, Krailling (DE); Frank Müller, Fürstenfeldbruck (DE); Thomas Mattes, Germering (DE); Peter Keller, Krailling (DE)

(73) Assignee: EOS GmbH Electro Optical Systems, Krailling (DE)

( * ) Notice: Subject to any disclaimer, the term of this patent is extended or adjusted under 35 U.S.C. 154(b) by 165 days.

(21) Appl. No.: 10/537,415

(22) PCT Filed: Oct. 6, 2003

(86) PCT No.: PCT/EP03/11032

§ 371 (c)(1),
(2), (4) Date: Feb. 17, 2006

(87) PCT Pub. No.: WO2004/050746

PCT Pub. Date: Jun. 17, 2004

(65) Prior Publication Data

US 2006/0246287 A1 Nov. 2, 2006

(30) Foreign Application Priority Data

Dec. 2, 2002 (DE) ............... 102 56 097

(51) Int. Cl.
*B32B 5/16* (2006.01)
(52) U.S. Cl. .............. 428/402; 428/325; 419/23; 528/323; 525/183
(58) Field of Classification Search ........... 428/402, 428/325; 528/323; 525/183; 419/23
See application file for complete search history.

(56) References Cited

U.S. PATENT DOCUMENTS

| | | | |
|---|---|---|---|
| 5,409,999 A | 4/1995 | Merval et al. | |
| 5,516,550 A | 5/1996 | Kikuchi et al. | |
| 5,650,226 A | 7/1997 | Lescaut | |
| 5,817,206 A | 10/1998 | McAlea et al. | |
| 5,910,558 A | 6/1999 | Schoenherr et al. | |
| 5,932,687 A | 8/1999 | Baumann et al. | |
| 5,990,268 A | 11/1999 | Dickens, Jr. et al. | |
| 6,027,814 A | 2/2000 | Julien et al. | |
| 6,136,948 A * | 10/2000 | Dickens et al. ........... | 528/323 |
| 6,245,281 B1 | 6/2001 | Scholten et al. | |
| 7,135,525 B2 * | 11/2006 | Petter et al. ........... | 525/183 |

FOREIGN PATENT DOCUMENTS

| | | |
|---|---|---|
| DE | 43 01 543 A1 | 7/1994 |
| DE | 44 10 046 C1 | 5/1995 |
| EP | 0 293 292 A1 | 11/1988 |
| EP | 0 412 888 A1 | 2/1991 |
| EP | 0 555 947 A1 | 8/1993 |
| EP | 0 755 321 B2 | 1/1997 |
| EP | 0 800 557 B1 | 10/1997 |
| EP | 0 863 174 A1 | 9/1998 |
| EP | 0 879 137 B1 | 11/1998 |
| JP | 10-001623 | 1/1998 |
| JP | 11-216779 | 8/1999 |

OTHER PUBLICATIONS

Kunststoffhandbuch "Technische Termoplaste Polyamide" Carl Hanser Verlag Munchen Wien, 1998, Kap. 4.14, 746-756.
Orgasol® Powders; (Brochure of the company Atofina concerning Orgasol.).
Translation of PCT International Preliminary Examination Report dated Nov. 16, 2004; for PCT/EP2003/01132; International Filing Date Oct. 6, 2003.
Orgasol, Technical Test Report: Measurement of the SSA level in Orgasol 2002 ES4 NAT 3 powders and 1002 ES4 NAT 1,Oct. 31, 2008 (in English).
Orgasol Ultrafine Polyamide Powders, Atofina (in English).
Orgasol Ultrafine Polyamide Powders, Atofina (in English).
Orgasol, Certificate of Analysis, Atofina (in English).
Orgasol, Analyse Granulometrique de grade Orgasol 1002 ES4 NAT1, Atofina (in English).
Orgasol 2002 ES4 NAT3, Sales Specifications.
Orgasol, Compte rendu technique: Mesure de la SSA de poudres Orgasol 2002 ES4 NAT13 et 1002 ES4 Nat 1 (in French), Oct. 31, 2008.
Orgasol, Technical Test Report: Measurement of the SSA level in Rilsan powder D30 NAT (batch 161 433) (in English), Nov. 12, 2008.

(Continued)

*Primary Examiner*—Leszek Kiliman
(74) *Attorney, Agent, or Firm*—McDonnell Boehnen Hulbert & Berghoff LLP

(57) ABSTRACT

In a laser sintering method for producing a three-dimensional object wherein subsequent layers of the object to be formed are subsequently solidified on positions corresponding to the object, as a build-up material, a powder is used wherein the upper grain limit of the powder particles is below 100 µm, the $D_{0.5}$-value is below 55 µm, the BET-surface is smaller than 5 m²/g and the grains of the powder basically have a spherical shape.

16 Claims, 4 Drawing Sheets

OTHER PUBLICATIONS

Rilsan-Powders for Paint Applications, Atofina, Brochure (in English).
Rilsan D30 NAT, Compte rendu tecnique: Messure de la SSA de poudres de Rilsan D30 Natural, Atofina (in French), (Nov. 12, 2008).
Orgasol, Technical Test Report: Measurement of the SSA level in Rilsan powder D30 NAT (in English), Nov. 12, 2008.
Declaration of Manuel Carmo (in French), Nov. 12, 2008.
Declaration of Manuel Carmo (in English) Nov. 12, 2008.
Rilsen, Sales History, Arkema (in English).
Le Rilsan dans les peintures, Brochure, Atofina (in French).
Rilsan in Paints (in English).
Rilsan, Compte Rendu Technique: Mesure de la SSA de poudres Rilsan D40 Natural et D50 natural, Arkema (in French), Nov. 13, 2008.
Rilsan, Technical Test Report: Measurement of the Ssa level in Rilsan powder D40 NAT and D50 NAT (in English), Nov. 13, 2008.
Orgasol-Ultrafine Polyamide Powders, Atofina, Brochure (in English, French and German).
Galloudec et al., "Enhancement of Mechanical and Optical Properties of Waterborne Polyurethane Lacquers on Plastics Surfaces by Using Ultra-Fine Polyamide Powders. A New Approach to "Soft Feel" Coatings," Powder Coatings Symposium, New Orleans, LA, Feb. 14-16, 1996 (in English).
Gero Lau, Diplom Arbeit, Folien zum Vortrag (in German).
Translation of Gero Lau, Diplom Arbeit, Folien zum Vortrag (in English), Nov. 13, 2001.
Monsheimer Sylvia, Eidesstattliche Versicherung, Degussa, Nov. 11, 2008.
Affidavit of Silvia Monsheimer, Nov. 11, 2008.
Orgasol Sales Specifications for Orgasol 3501 EXD NAT 1.
Orgasol Sales Specifications for Orgasol 2002 ES5 NAT 3.
Translation of "Kunststoff Handbuch-Polyannide, Carl Hanser Verlag, München/Wien, 1998, Kap 4.14, pp. 746-756".

* cited by examiner

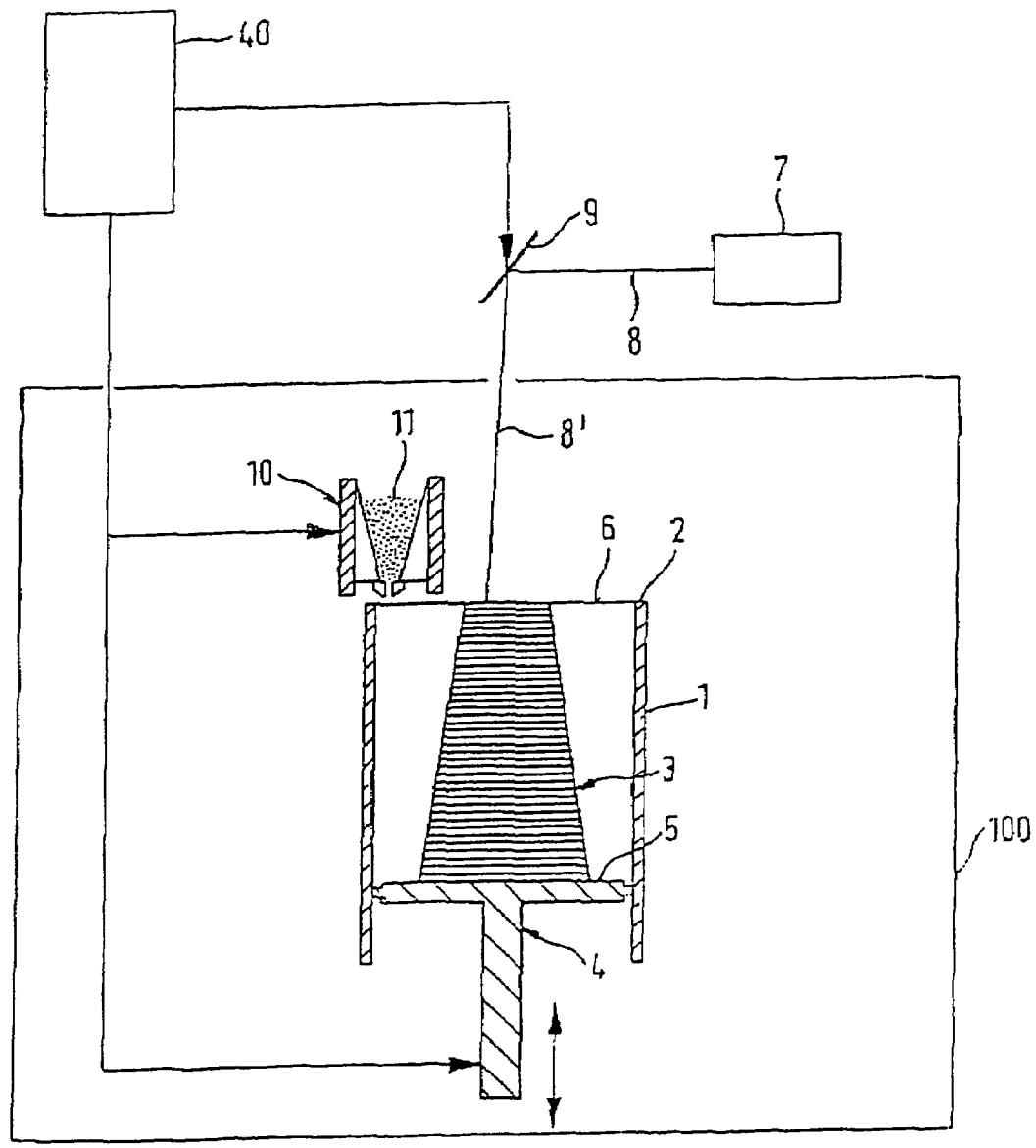

raw material
PA 12 x 10000

Test-1 x 10000

ROUNDED-PARTICLE PLASTIC POWDER IN PARTICULAR FOR APPLICATION IN LASER SINTERING, METHOD FOR PRODUCTION OF SUCH A POWDER AND LASER SINTERING PROCESS USING SUCH A POWDER

FIELD OF THE INVENTION

The present invention relates to a rounded-particle plastic powder, particularly for use in laser sintering, to a method for producing such a powder as well as to a laser sintering method for producing a three-dimensional object using this powder.

BACKGROUND AND SUMMARY OF THE INVENTION

Plastic powders develop directly during polymerisation of corresponding monomers (for example in suspension polymerisation), by mechanical comminution in a mill appropriate for the respective plastic and for the required degree of comminution, by spraying a solution or melt of the plastic by means of an appropriate nozzle through which the solution/melt is pressed under high pressure, and by dissolving of the plastic in an appropriate solvent and precipitation by reduction of the temperature and/or increase of the polymer concentration in the solution.

As applications of such precipitated powders made of polyamide 11 and polyamide 12 the literature (handbook of plastics "Polyamide", Carl Hanser Verlag, Munich Vienna, 1998, chapter 4.14, pages 746-756) mentions: coating of metals by dip coating in a fluidised bed; electrostatic powder coating; and addition to coil-coating varnishes. Further, the use of polyamide powders in cosmetics is known (described in the firm brochure concerning Orgasol of the firm Atofina; obtainable in the internet at www.atofina.com with the keyword Orgasol Cosmetics).

For a person skilled in the art, it is perspicuous that a high bulk density and a high pourability are important for the mentioned applications of these powders. Moreover, they shall have a small BET-surface measured according to DIN ISO 9277. These characteristics depend on the shape of grains. Therefore, those shapes of grains are favoured which are free of sharp edges (spherical) and which are not porous. This demand is also and particularly valid for laser sintering for which the advantages of the powder according to the invention will be described in detail.

The demand is only fulfilled by such plastic powders formed directly during polymerisation. Powders formed by milling or precipitation according to the prior art do not fulfil the demand.

Milled powders additionally comprise the disadvantage of a broad distribution of grains. As a result, since the applications require limited bands of grains, they must comprise a subsequent classifying process in which part of the powder has to be removed as a worthless by-product.

Precipitated powders, sprayed powders or powders attained from melt dispersion often have grain size distributions necessary for the envisaged application. For example, EP 863 174 discloses a method for producing polyamide powders for coatings wherein a homo-polyamide or a co-polyamide is precipitated from an alcoholic solution. A polyamide powder produced by this method has an upper grain size limit of 100 μm, a $D_{0.9}$-value below 90 μm, a $D_{0.1}$-value below 32 μm and a BET-surface below 10. However, the porosity expressed as BET-surface is still high. Thereby, the process of precipitation arrives at its limits, since with constant or decreasing mean grain, only a defined range for adjusting the BET exists.

In laser sintering of plastic powders, as is known from DE 44 10 046, for example, three-dimensional objects are manufactured in a layerwise manner by applying layers of a powder and bonding them to each other by selective solidification at positions corresponding to cross-sections of the objects. According to the method characteristic, specific demands are put onto the powder.

To provide for a high precision in detail and quality of surface of the objects to be produced, plastic powders are required to have an upper grain size limit of 100 μm and a 90%-fraction ($D_{0.9}$-value) below 90 μm. Furthermore, to provide for a stable application of layers, the powders must have a 10%-fraction ($D_{0.1}$-value) of less than 32 μm. Furthermore, the particles should have a spherical grain shape. This grain shape is also necessary to provide for a smooth and even surface.

When using plastic powders for laser sintering, a low porosity of the particles, expressed as BET-surface, is required, since thereby the density of the powder bed can be increased and the reaction tendency and aging of the powder are strongly decreased. The last mentioned characteristics are very important in laser sintering, since high temperatures occur during the process and the process time may be very long which, depending on the type of plastic, may lead to build-up and decomposition processes and thus may complicate the recyclability of the powder. The latter shows in a high refreshing factor, which, in recycling of powder, is given by the percentage of fresh powder that has to be added to the recycled powder to avoid a variation in the laser sintering and object characteristics compared to a laser sintering process using fresh powder only.

By the large BET-surface, ageing of the unexposed powder during the sintering process is promoted whereby a high refreshing factor becomes necessary to prevent occurrence of drawbacks in surface quality and mechanical properties of the sintered objects.

Therefore, it is an object of the invention to provide a powder optimised with respect to pourability and porosity which is particularly suitable for laser sintering, and to provide a laser sintering method using this powder as a build-up material.

The object is attained by a powder according to claim 1 and by a method according to claim 12.

Further developments of the invention are specified in the subordinate claims, respectively.

Further features and advantages of the invention will arise from the description of embodiments with reference to the figures, of which:

BRIEF DESCRIPTION OF THE DRAWINGS

FIG. 1 shows a schematic view of the construction of a device for producing a three-dimensional object by means of the laser sintering method.

DETAILED DESCRIPTION OF EMBODIMENTS OF THE INVENTION

Figure 2A:
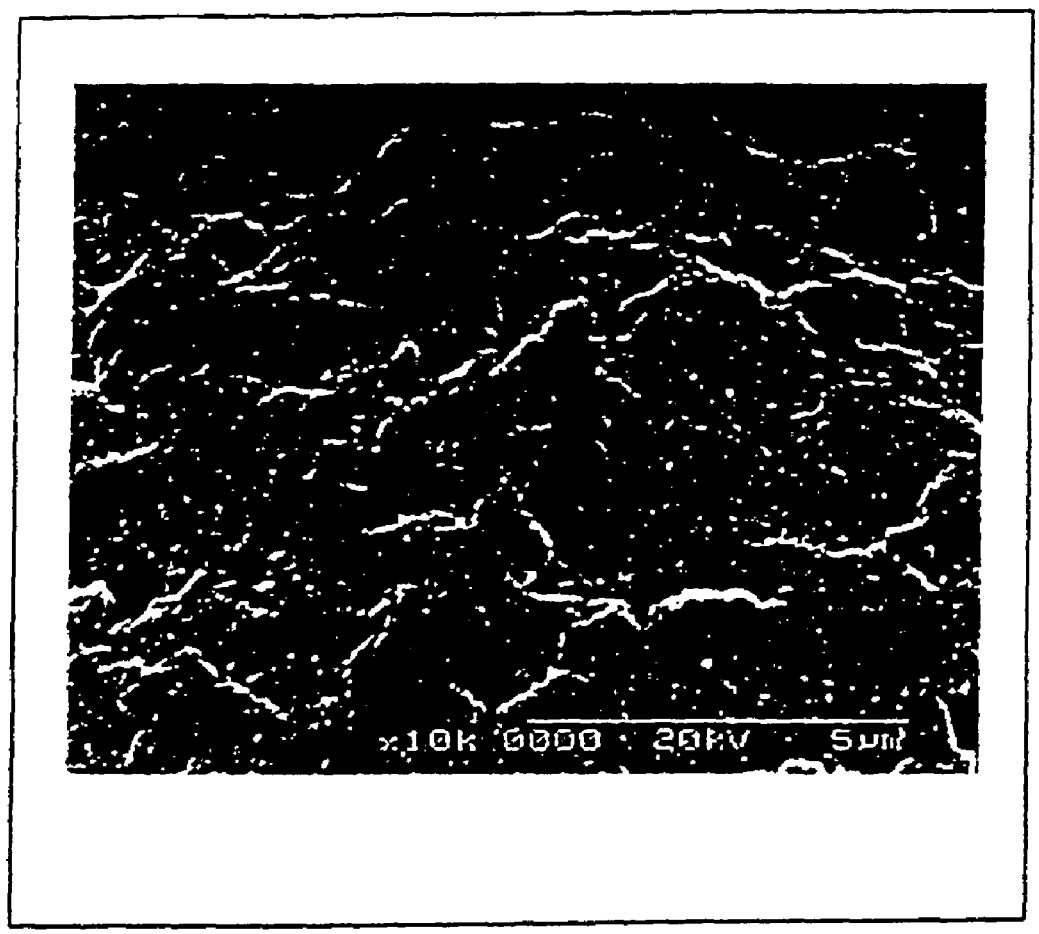
FIGS. 2a and 2b show SEM recordings 10000× of a PA12 precipitated powder (a) before the treatment and (b) after the treatment.

As can be seen form FIG. 1, a device for performing a laser sintering method comprises a container 1 formed only by a side wall closed in the circumferential direction. By the upper edge 2 of the side wall or of the container 1 an operating plane 6 is defined. In the container 1, a carrier 4 is located for supporting an object 3 to be formed. The object is located on the upper surface of carrier 4 and is formed of a plurality of layers of a pulverous build-up material solidifiable by means of electromagnetic radiation and extending in parallel to the upper surface of carrier 4. By means of a height adjusting device, carrier 4 can be moved in the vertical direction, i.e. parallel to the side wall of container 1. Thereby, the position of carrier 4 with respect to the operating plane 6 can be adjusted.

Above container 1 and the operating plane 6, respectively, a supply device 10 is provided for applying a powder material 11 to be solidified onto the carrier surface 5 or onto a layer previously solidified. Furthermore, above operating plane 6 an irradiating apparatus in form of a laser 7 is arranged, emitting a directed light beam 8 which is deflected in the direction to the operating plane 6 as a deflected beam 8' by a deflection device 9, e.g. a rotatable mirror.

In manufacturing the three-dimensional object 3, the powder material 11 is applied onto the carrier 4 or onto a layer previously solidified in a layerwise manner and is solidified by the laser beam 8' at the positions of each powder layer that correspond to the object. Thereby, the carrier 4 is lowered layerwise.

Different methods of subsequent treatment of plastic powders were examined to improve their characteristics with respect to laser sintering. Thereby, it was the intention to attain smoothing of the surface characterised by a lower BET-surface by application of mechanical or mechanical-thermal energy.

As base material, a PA12 precipitated powder produced according to the prior art of EP 863 174 was used having a 10%-fraction below 38 μm ($D_{0.1}$<38 μm), a 50%-fraction below 57 μm ($D_{0.5}$<57 μm) and a 90%-fraction below 77 μm ($D_{0.9}$<77 μm), as well as a BET-surface of 6 m$^2$/g.

All of the following examples of powder treatment provide a polymer powder for producing a three-dimensional object according to the invention.

EXAMPLE 1

The base powder was subsequently treated in a commercially available powder treatment machine NHS-1 of the company Nara in the style of a method described in the patent EP 555 947. The duration of treatment was one minute; the number of revolutions was 8000 rpm.

EXAMPLE 2

The base powder was treated as in Example 1 but the duration of treatment was three minutes instead of one minute.

EXAMPLE 3

The base powder was subsequently treated in a commercially available mixer by shear mixing. Thereby, the number of revolutions of the agitator was adjusted for the powder to heat-up to 140° C. within ten minutes. Then, the number of revolutions was lowered in so far as to hold the temperature constant at 140° C. for another time period of five minutes.

EXAMPLE 4

The base powder was treated as in Example 3 but the duration of the holding period was ten minutes.

The numbers of revolutions, durations of treatments and temperatures used in Examples 1 to 4 are summarised in Table I.

Figure 2B:
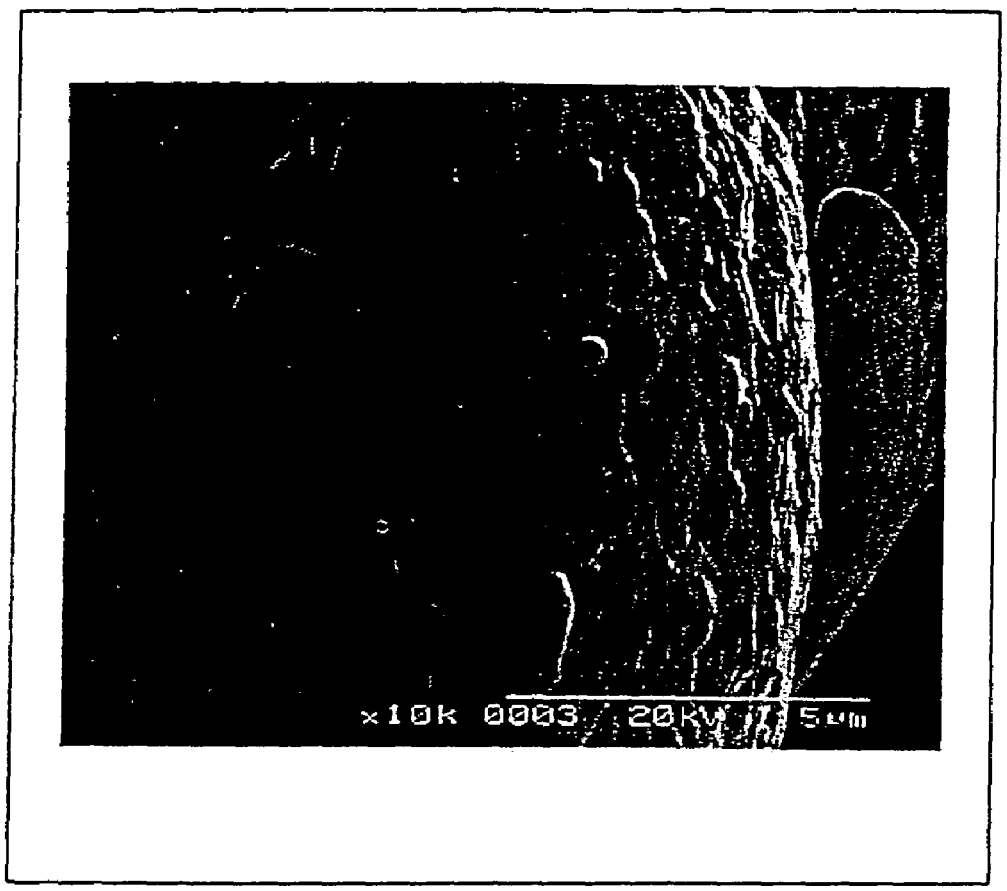

FIG. 2a shows a SEM recording of the PA12 precipitated base powder. FIG. 2b shows a SEM recording of the PA12 precipitated powder after application of the subsequent treatment according to Example 1. The factor of magnification is 10000 in both cases. A comparison of the two figures clearly shows the decrease in jaggedness of the surface of the particles as a result of the subsequent treatment. This observation is also confirmed by the measured value of the BET-surface which was 3.6 m$^2$/g for the powder subsequently treated according to Example 1.

Table I shows the BET-surfaces and grain size distributions determined for the powders subsequently treated according to Examples 1 to 4. Thereby, the grain size distributions of the powders were each determined by light-scattering in the laser beam and the BET-surfaces by adsorption of nitrogen. $D_{0.1}$ gives the diameter in μm for which, according to laser scattering, 10% of the powder volume is below this diameter in the integral grain distribution, $D_{0.5}$ gives the diameter in μm for which, according to laser scattering, 50% of the powder volume is below this diameter in the integral grain distribution, and $D_{0.9}$ gives the diameter in μm for which, according to laser scattering, 90% of the powder volume is below this diameter in the integral grain distribution.

Figure 3:
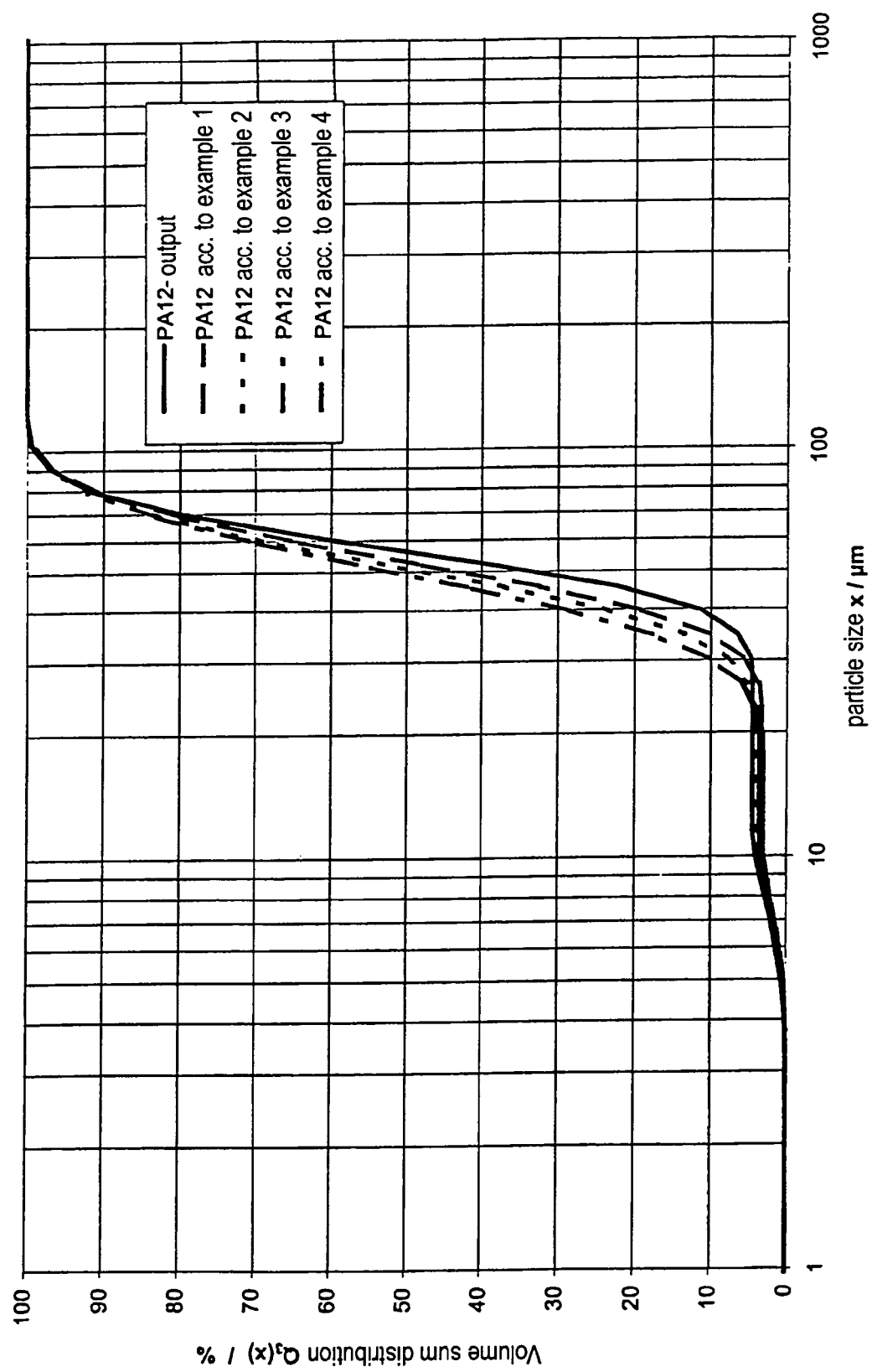
FIG. 3 shows the integral of the grain distribution for the powders treated according to Examples 1 to 4 in dependency of the particle size.

Thereby, in FIG. 3, the integral grain distribution for the powders treated according Examples 1 to 4 is shown. Thereby, in the diagram of FIG. 3 on the abscissa, the particle size x is plotted in μm, while on the ordinate, the overall volume of all particles having a particle size smaller than x is plotted as a value in percents.

It can be seen that by choice of the conditions of the subsequent treatment, the BET-surface was reduced up to a factor of 7.5, without considerably altering the grain size distribution by the subsequent treatment.

The reduction of the BET-surface led to a refreshing rate of the treated powders clearly lower as compared to the untreated powder. In an application of the powder treated according to Example 1 (reduction of the BET-surface: 1.67 times) and of the powder treated according to Example 3 (reduction of the BET-surface: 3.16 times), in recycling of the powder a refreshing factor having a value of 30% and 20% followed, respectively, compared to a value of 50% when using an untreated powder.

The effects of the grain rounding and surface smoothing are not limited to the described PA12 precipitated powder but also occur in PA12 powders produced according to other methods as well as in other plastic powders. Particularly, if the start material is a milled powder, the surface smoothing is associated with grain rounding.

Not only for the durations of treatments and temperatures given above, the above-attained low values for the BET-surface in combination with the attained grain distributions are attainable.

Particularly advantageous results are attainable when the duration of treatment is longer than one minute. Furthermore, the desired powder characteristics are attainable when performing the treatment at room temperature (>15° C.) as well as at an elevated temperature, as long as this temperature is below the melting point of the powder.

In the method according to claim 3, particularly advantageous results are also attainable when the temperature differs from 140° C. by ±20 degrees und the duration of treatment is longer than 5 minutes.

The powder treatment methods described above may also be applied in the purpose of an improved mixing of powders consisting of plural components. With the above treatment, agglomerates of one powder component can be dispersed in an improved manner. Furthermore, the methods are applicable for producing coated powders wherein particles of a coating material (additive or polymer powder) are solely melted onto the surface of the base material.

This opens the introduction of new materials in the field of laser sintering; the range of usable powder materials can thereby become strongly enlarged. The facilitated production of composite powders leads to the characteristics of the manufactured three-dimensional objects being influenceable in a simple manner by correspondingly composed powders. In this way, for example the stiffness, the colour, the electric properties of the objects or the fire retardance can be influenced.

Although the powder treatment methods described in this application are described in connection to laser sintering, the advantageous powder characteristics attained by these methods are of use in other industrial processes as well, as for example in powder coating operations or the production of cosmetics, sinter powders, additives for coil-coating varnishes.

TABLE I

| subsequent powder treatment | number of revolutions [rpm] | time [min] | temperature [° C.] |
|---|---|---|---|
| according to Example 1 | 8000 | 1 | |
| according to Example 2 | 8000 | 3 | |
| according to Example 3 | 1300 | 5 | 140 |
| according to Example 4 | 1300 | 10 | 140 |

TABLE II

| | BET-surface [m²/g] | grain size distribution $D_{0.1}/D_{0.5}/D_{0.9}$ [µm] |
|---|---|---|
| base material | 6.0 | 38/57/77 |
| powder treated according to Example 1 | 3.6 | 35/54/76 |
| powder treated according to Example 2 | 0.8 | 32/52/75 |
| powder treated according to Example 3 | 1.9 | 30/49/75 |
| powder treated according to Example 4 | 1.7 | 30/49/75 |

What is claimed is:

1. A polymer powder for producing a three-dimensional object by means of laser sintering, wherein the powder comprises a BET-surface which is smaller than 6 m²/g and at the same time the upper grain limit is below 100 µm, the $D_{0.9}$-value is below 90 µm, and the $D_{0.5}$-value is below 60 µm and the particles comprise a basically spherical shape.

2. A polymer powder according to claim 1 for producing a three-dimensional object by means of laser sintering, wherein the powder comprises a BET-surface which is smaller than 5 m²/g and at the same time the upper grain limit is below 100 µm, the $D_{0.9}$-value is below 80 µm, and the $D_{0.5}$-value is below 55 µm and the particles comprise a basically spherical shape.

3. A powder according to claim 1, wherein the powder has a BET-surface having a value smaller than or equal to 4 m²/g.

4. A powder according to claim 3, wherein the powder has a BET-surface having a value smaller than or equal to 3 m²/g.

5. A powder according to claim 4, wherein the powder has a BET-surface having a value smaller than or equal to 2 m²/g.

6. A powder for manufacturing a three-dimensional object by means of laser sintering according to claim 1, wherein a laser sintering refreshing factor is less than 50 percent.

7. A powder according to claim 6, wherein the refreshing factor is less than 30 percent.

8. A powder according to claim 1, wherein the powder is a polyamide powder.

9. A powder according to claim 1, wherein the powder consists of polyamide 11 or polyamide 12.

10. A powder according to claim 8, wherein the powder is a precipitated PA12 powder.

11. A method for producing a powder according to one of claims 1, 2-10, wherein as a base material a plastic powder attained by means of precipitation or milling is used which is mechanically or mechanically-thermally mixed for at least one minute in an appropriate aggregate.

12. A method according to claim 11 wherein the base material has at least one further powder component.

13. A method according to claim 12 wherein a further powder component is a polymer powder or an additive.

14. A method for manufacturing a three-dimensional object by means of laser sintering wherein subsequent layers of the object to be formed are subsequently solidified from solidifiable powder material in positions corresponding to the object and a powder as in any one of claims 1 or 2-10 is used as powder material.

15. A method according to claim 14 wherein the powder base material has at least one further powder component.

16. A method according to claim 15 wherein a further powder component is a polymer powder or an additive.

* * * * *